R. DOERING.
TWINE OILER.
APPLICATION FILED AUG. 8, 1918.
1,335,667.
Patented Mar. 30, 1920.
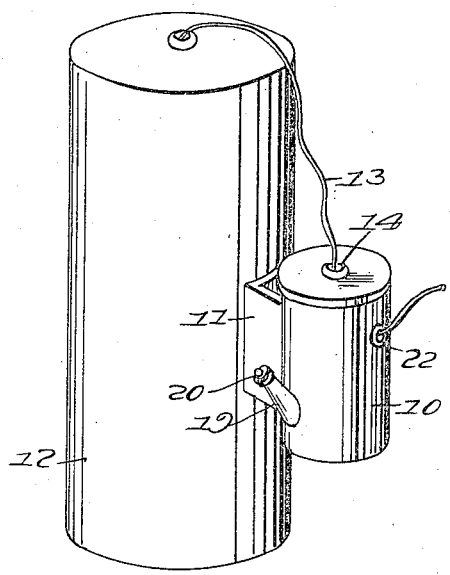
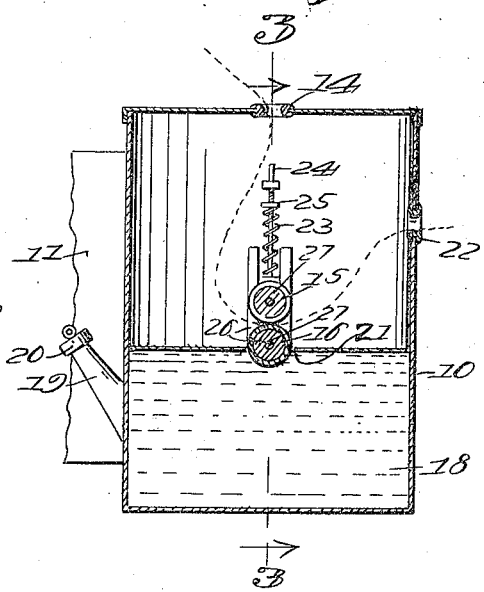
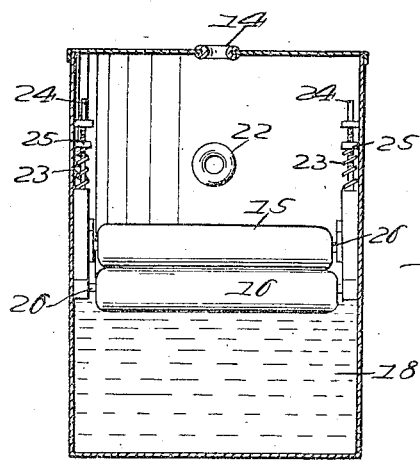
Inventor
Ruben Doering,
By
Attorney

UNITED STATES PATENT OFFICE.

RUBEN DOERING, OF CROFTON, NEBRASKA.

TWINE-OILER.

1,335,667. Specification of Letters Patent. Patented Mar. 30, 1920.

Application filed August 8, 1918. Serial No. 249,035.

*To all whom it may concern:*

Be it known that I, RUBEN DOERING, a citizen of the United States, residing at Crofton, in the county of Knox and State of Nebraska, have invented new and useful Improvements in Twine-Oilers, of which the following is a specification.

The object of the invention is to provide a simple and inexpensive apparatus designed to be applied to a binder for the purpose of applying oil to the binding twine used in forming the bundles, for the purpose of protecting the twine against attack by grasshoppers and other insects which otherwise feed upon and destroy the twine and thereby liberate the bundles.

To this end, the invention consists in providing as an attachment to the usual twine box of a binder, an oiling device through which the twine is adapted to be drawn in its passage from the twine box to the point of use, so that the twine becomes coated or saturated with the oil before it is applied to the bundles without special attention or manipulation on the part of the operator.

The invention consists further in a specific construction, combination and arrangement of parts hereinafter set forth, it being understood that changes in form, proportions and details may be resorted to, within the scope of the appended claim, without departing from the spirit of the invention.

In the drawings:

Figure 1 is a general view of a twine oiling device representing a preferred embodiment of the invention applied in the operative position to a binder twine box, Fig. 2 is a vertical sectional view of the oiling apparatus, Fig. 3 is a further sectional view taken on a vertical plane indicated by the line 3—3 of Fig. 2, The oiler representing the invention consists essentially of a can or receptacle 10 which is adapted to be supported by means of brackets 11 or the equivalent thereof to the side of an ordinary twine box 12 such as used ordinarily upon binders and similar machines now in common use, the twine 13 being led from the top of the twine box in the usual way and extending into the can or receptacle through a guide eye 14 in the top thereof and thence between oiling rollers 15 and 16 which are located in parallel relation at any convenient point within the can. Preferably a horizontal partition 17 is provided at an intermediate level in the can so as to separate the lower or oil receptacle 18 from the upper portion of the receptacle, to prevent splashing and spilling of the liquid contents, a filling nozzle 19 being disposed in communication with this oil compartment and being fitted with a removable cap or closure 20.

The partition 17 is transversely slotted as shown at 21 for the reception of the lower roller 16 which in common with the upper roller is provided with a surface of rubber so as to provide for yielding contact with the twine which passes therebetween, and the lower roller projecting downwardly through the slot in the partition is designed to dip into the oil in the lower compartment of the receptacle and thus convey oil upwardly through the partition to apply it uniformly to the twine as the latter is drawn through the receptacle and passes out by way of a lateral guide eye 22. Both of the described guide eyes are preferably protected by rounded beads or rings to avoid unnecessarily chafing the twine. Also the upper roller 15 is preferably held in yielding contact with the lower roller, or the interposed twine by means, for example, of springs 23 carried by bolts 24 engaged at their upper ends by nuts or burs 25 so that the tension may be varied as required. Also the spindles 26 of the oiling rollers may be extended through metallic sleeves 27 which carry the rubber bearing surfaces of the rollers and receive the wear incident to the rotation thereof.

After leaving the oiler, the twine is adapted to be led to the tying or binding mechanism in the ordinary way, or to be manipulated by hand, as preferred, the operation of these related and ordinary parts of a binder mechanism being unaffected by the use of the apparatus forming the subject of this invention and relating solely to means intermediate between the supply of the twine and the binder mechanism for treatment of the twine as used, to protect it against deterioration and the ravages of destructive insects.

What is claimed is:—

A twine oiling apparatus for binders having a can or receptacle provided with inlet and outlet twine guides, and an interior transverse partition forming a lower oil compartment, filling means in communication with said oil compartment, upper and lower coöperative rollers provided with yielding surfaces arranged in contact, the lower roller being arranged in a slot in said partition to have contact with the liquid contents of the oil compartment, and adjustable yielding means for controlling the pressure of the upper roller upon the lower roller.

In testimony whereof I affix my signature.

RUBEN DOERING.